(12) United States Patent
Arnvidarson

(10) Patent No.: US 7,155,345 B1
(45) Date of Patent: Dec. 26, 2006

(54) SYSTEM FOR REGULATING THE HANDLING OF MILK DURING THE MILKING PROCESS AND A METHOD FOR REGULATING SAID MILKING PROCESS

(75) Inventor: Borkur Arnvidarson, Nivå (DK)

(73) Assignee: ChemoMetec A/S, Herlev (DK)

( * ) Notice: Subject to any disclaimer, the term of this patent is extended or adjusted under 35 U.S.C. 154(b) by 0 days.

(21) Appl. No.: 09/830,558

(22) PCT Filed: Nov. 5, 1999

(86) PCT No.: PCT/DK99/00606

§ 371 (c)(1),
(2), (4) Date: May 7, 2001

(87) PCT Pub. No.: WO00/27183

PCT Pub. Date: May 18, 2000

(30) Foreign Application Priority Data

Nov. 5, 1998 (DK) .......... 1998 01437
Nov. 11, 1998 (DK) .......... 1998 01468

(51) Int. Cl.
*G01N 33/48* (2006.01)
*G06F 7/00* (2006.01)
*A61K 39/29* (2006.01)

(52) U.S. Cl. .............. 702/19; 702/20; 435/2; 435/7.1; 426/2; 426/231; 426/237; 426/491

(58) Field of Classification Search ............. 702/19, 702/20; 435/2, 7.1; 426/2, 231, 237, 491
See application file for complete search history.

(56) References Cited

U.S. PATENT DOCUMENTS

| | | | | |
|---|---|---|---|---|
| 3,668,925 | A | 6/1972 | Mesek | 73/61 R |
| 3,874,337 | A | 4/1975 | Umbaugh et al. | 119/14.15 |
| 4,385,590 | A | 5/1983 | Mortensen | 119/14.01 |
| 4,771,007 | A | 9/1988 | Tippetts et al. | 436/150 |
| 5,664,521 | A | 9/1997 | Simpson et al. | 119/14.02 |
| 5,704,311 | A | 1/1998 | van den Berg | 119/14.02 |
| 5,722,343 | A | 3/1998 | Aurik et al. | 119/14.02 |
| 5,873,323 | A | 2/1999 | van den Berg et al. | 119/14.02 |
| 5,896,827 | A | 4/1999 | Brown | 119/14.02 |

FOREIGN PATENT DOCUMENTS

| | | |
|---|---|---|
| DE | 27 59 126 | 7/1979 |
| DE | 39 35 759 | 5/1991 |
| DE | 40 07 327 | 7/1991 |
| DE | 293 429 A5 | 8/1991 |
| DE | 41 34 549 | 4/1993 |
| DE | 195 47 892 | 7/1997 |
| DE | 196 30 146 | 1/1998 |
| EP | 0 385 539 | 9/1990 |
| EP | 0 397 583 | 11/1990 |
| EP | 0 399 604 | 11/1990 |
| EP | 0 628 244 | 12/1994 |
| EP | 0 683 395 | 11/1995 |
| EP | 0 688 162 | 12/1995 |
| GB | 2 001 434 | 1/1979 |
| NL | 8602505 | 10/1986 |
| WO | 86/01687 | 3/1986 |
| WO | 94/19931 | 9/1994 |
| WO | 95/22888 | 8/1995 |
| WO | 95/35028 | 12/1995 |
| WO | 96/03031 | 2/1996 |
| WO | 96/11568 | 4/1996 |
| WO | 96/16536 | 6/1996 |
| WO | 97/07390 | 2/1997 |
| WO | 98/04119 | 2/1998 |
| WO | 98/28969 | 7/1998 |
| WO | 98/30084 | 7/1998 |
| WO | 99/03332 | 1/1999 |
| WO | 99/31966 | 7/1999 |
| WO | 99/41605 | 8/1999 |
| WO | 99/41977 | 8/1999 |

OTHER PUBLICATIONS

Packard et al. Automated Technique for Sampling Milk from bulk Farm Tanks: Collaborative Study. (1993) Journal of AOAC International, vol. 76, No. 2, pp. 297–305.*
Tsenkova et al.; Near–Infrared Sprectroscopy of Individual Cow Milk as a Means for Automated Monitoring of Udder Health and Milk Quality; 1994.

* cited by examiner

*Primary Examiner*—Mary K. Zeman
(74) *Attorney, Agent, or Firm*—Jacobson Holman PLLC

(57) ABSTRACT

The present invention concerns a system and a method for regulating the handling of milk during the milking process in order to separate mastitis infected milk from milk for human consumption and apt to be applied in an automated milking process.

59 Claims, 1 Drawing Sheet

SYSTEM FOR REGULATING THE HANDLING OF MILK DURING THE MILKING PROCESS AND A METHOD FOR REGULATING SAID MILKING PROCESS

FIELD OF THE INVENTION

This invention relates to a system for regulating the handling of milk during the milking process and a method for regulating said milking process. The regulation results in a separation of good quality milk from milk of poor quality due to e.g. the presence of a contaminant such as cells resulting from mastitis. The method of the invention is based on the assessment of at least one property of at least one particle type present in the milk.

DESCRIPTION OF THE RELATED ART

Various milking systems for regulating a milking process have been described in the art. Such milking systems are often based on the principle that an animal to be milked, such as a cow, voluntarily enters a milking stall fitted with a milking robot for automatically milking the cow. Such milking systems are described in among others WO 99/41977, WO 99/03332, WO 96/11568, WO 96/03031, and U.S. Pat. No. 5,896,827. By the term milking process is meant, not only the actual milking of the animal but also the process of transferring the milk to the storage means at the milking equipment.

Automated milking systems are used in automated process regulation. The process regulation involves a continued assessment of the quality of the milk entering the system. It is important to be able to separate milk of a good quality from milk that is regarded as not suitable for human consumption due to e.g. cells in the milk caused by infection. The cells may occur e.g. as a result of a cow having contracted mastitis. In order to perform the separation step it is necessary to be able to assess the quality of the milk.

Various methods for the assessment of milk quality are described in the art. The methods exploit a variety of measuring means, but are either not particularly accurate or unsuitable for use in an automated milking system. Filtration of milk, analysis of the retained material, and correlation of the result of the analysis with the occurrence of an inflammatory condition in the animal being milked represents one prior art method.

U.S. Pat. No. 5,722,343 relates to a combination of filtration of milk and the use of an optical sensor for detecting a contaminant including lumps often observed in relation to mastitis infection. Filtration is time consuming and the assessment of contaminants by means of an optical sensor does not represent an accurate and reliable assessment of milk quality.

U.S. Pat. No. 4,385,590 relates to filtration of milk, optically measuring the retained material, and correlating the optical measurement with the occurrence of an inflammatory condition such as mastitis. Filtration is time consuming and the correlation of the optical assessment with mastitis is neither accurate nor reliable.

U.S. Pat. No. 3,668,925 relates to a method of filtration of milk, characterisation of leukocytes in the retained material, and correlation of a high number of leukocytes with the occurrence of an inflammatory condition such as mastitis. However, this method is also time consuming and unsuitable for use with an automated milking system.

The prior art also discloses that the electrical conductance or capacitance of a milk sample may be used as an indication of an inflammatory condition in the animal being milked. However, alterations in electrical conductance or capacitance may have many causes and often includes factors that are not related to the occurrence of an inflammatory condition such as mastitis.

WO 95/22888 relates to the measurement of electrical conductance or capacitance, and the correlation of a certain value of an obtained result with the occurrence of mastitis.

Correlation of electrical conductance or capacitance with an inflammatory condition including mastitis is also described in U.S. Pat. No. 5,873,323, U.S. Pat. No. 5,704,311, U.S. Pat. No. 5,664,521, and U.S. Pat. No. 4,771,007.

The above methods can be used in combination with an automated milking system, albeit with an unsatisfactory result in terms of speed, accuracy and reliability. The prior art describes additional elaborate and complex methods for the assessment of milk quality. However, nowhere in the prior art have these additional methods been suggested for use in an automated milking system or for aiding the complex decision making process of operating an automated milking system. Consequently, the prior art has not provided methods suitable for assessing somatic cell counts in e.g. an automated milking system.

Somatic cells per volume of milk represent one parameter that is important in the determination of the quality of the milk, and conventional methods for direct determination of the number of somatic cells per volume of milk are mainly based on elaborate and costly techniques such as flow cytometry or advanced microscopy. Due to the relative high complexity and cost of the instruments used today, most of the assessments of the number of somatic cells in a milk or a milk product analyte are carried out on in a laboratory where skilled operators operate the instruments. The laboratory will be physically separated from the automated milking system, and the generation of laboratory results is far too slow to be of any significant help in regulating the automated milking process.

Instruments for performing flow cytometry are available, e.g., from Becton, Dickinson and Company, Franklin Lakes, US. However, flow cytometry requires rather elaborate and high cost equipment, partly because of the high accuracy of the flow rate required in order to give reliable results, and party because of the high sensitivity required in order to detect the weak signals from the particles in question during the relative short periods of time in which the particles are present in the detector.

EP 397583 relates to a cytofluorometric method comprising the steps of obtaining a milk sample, contacting the sample with a fluorophor capable of being bound by cellular nucleic acids, passing the sample through a capillary tube being in operational contact with a laser, and assessing the amount of fluorophor bound to nucleic acid, and optionally also the density of the cell suspension. An assessment of the number of cells passing through the capillary tube is only possible when the laser being in operational contact with the capillary tube is capable of detecting individual cells. However, due to the number of cells being present in milk, an assessment of individual cells is practically impossible. An assessment of individual cells would require that a very dilute sample was passed through the capillary tube, and the time involved in measuring cells in a sufficiently large sample volume makes the described method unsuitable for use with an automated milking system.

GB 2001434 is also based on the correlation of the detection of a fluorophor bound to a cellular component with the occurrence of an inflammatory condition including mastitis.

Another known method for the determination of somatic cells in milk is based on the detection of signals from particles which are dispersed on the rim of a polished rotating disc, one such instrument being available from Foss Electric, Hillerod, Denmark. The accuracy in the assessment of the number of particles using this method is dependent on the physical shape of the thin film of sample dispersed on the disk, and a high sensitivity is needed to detect the weak signals from the particles in question in the course of the relative short period of time in which the particle is present in the detector.

A method for the determination of somatic cells in milk based on spreading a film of milk onto a ribbon-like film which is then analysed by the means of a microscope is described in EP 0 683 395. However, this method is likely to require a complex mechanical solution in order to work reliably.

One method accepted by the International Dairy Federation as a reference method for the assessment of the number of somatic cells in milk is described in the International IDF Standard 148A:1995. The method is based on spreading a sample of the milk onto a surface where the sample is dried and subsequently stained with a dye that is substantially specific for the staining of somatic cells. The sample is then submitted to an investigation by microscopy and the result is correlated to the number of somatic cells per volume of the milk sample.

It is dear from the above that preferred embodiments of the present invention pertaining to the assessment of the number of somatic cells in milk are associated with only a substantially small method error or deviation from the above reference method. This preferably includes methods which are either based on the direct counting of somatic cells or methods based on the use of detailed information about the composition of the milk, e.g. spectroscopical methods, for the assessment of the number of somatic cells in the milk.

Consequently, the prior art methods described herein above are either not sufficiently accurate and reliable for the assessment of the quality of milk in an automated milking system, or they are impractical, expensive to use, and require a skilled technician for correct operation conditions and maintenance. None of the prior art methods are well suited for operation in combination with the complex decision making process and management of an automated milking system. It is necessary that the assessment of milk quality in an automated milking system is quick, accurate and reliable. The regulation process and the system according to the present invention provides a much needed quick, accurate and reliable assessment of milk quality.

The regulation of the handling of milk during milking based on the quality of the milk may also be carried out in combination with a visual inspection of the milk. Such a visual inspection may be required by law, and the inspection may be done manually by an operator of the milking apparatus. However, this inspection will primarily reveal large biological particles, and/or textural and/or reological abnormalities that are often present in milk from animals suffering from mastitis or some similar disease or having a physiological state that affects the quality and/or the composition of the milk. Accordingly, a visual inspection cannot replace the method of regulating a milking process according to the present invention.

DESCRIPTION OF THE INVENTION

The present invention offers substantial simplification and improvements to the automation of the handling of milk during milking, compared to present methods based e.g. on visual inspection, by offering real-time, simple and reliable methods for the assessment of particles in the milk, such as direct counting of somatic cells in the milk, or the determination of morphological properties or counting of other biological particles in the sample.

The method of regulating a milking process according to the invention is based on the determination or assessment of at least one property of at least one particle type present in the milk, such as the number of somatic cells or fragments thereof (wherein said fragments are understood to be included whenever somatic cells are mentioned in the following), the number of and/or the morphological properties of one or several types of biological particles, and preferably also the assessment of one or more chemical or physical property of the milk. The purpose of the assessment is to provide results that can be used for the substantially real-time regulation, or adjustment of, the milking process, and/or the transport of milk during milking. Furthermore, any result of the assessment of the milk can be used for registration of one or more properties of a veterinary or herd management purpose.

The present invention makes it possible for an operator without any particular skill in this technical field to perform the assessment needed for automatic, accurate and reliable determination of the handling of milk during milking. The invention is well suited for the regulation of the handling of milk, when the animal being milked is cow, goat, sheep, buffalo, or any other animal.

In one particularly interesting aspect, the present invention relates to a method for regulating a milking process, said method comprising the steps of
  i) identifying at least one volume of milk,
  ii) assessing particles in the identified volume by either
    a) counting of substantially individual somatic cells in the volume of milk, or
    b) assessing at least one property of at least one biological particle in the volume of milk,
  iii) obtaining at least one result of the assessment of particles in the identified volume of milk,
  iv) providing at least one predetermined milk quality parameter,
  v) correlating the at least one result obtained in step iii) with the predetermined milk quality parameter provided in step iv),
  vi) transferring any one or both of
    c) the at least one result obtained in iii), and
    d) the correlation obtained in v)
    to regulating means capable of regulating the milking process of at least a portion of the milk being milked, and
  vii) regulating the milking process based on any one or both of c) the at least one result obtained in iii), and d) the correlation obtained in v).

The above method also facilitates assessing at least one chemical or physical property of the milk, said assessment preferably being made substantially simultaneously with the assessment of the particles in the identified volume of milk.

The method according to the invention is also well suited for the assessment of the number of somatic cells in milk when the objective of the analysis is to generate information used in a heard improvement scheme, or when the objective of the analysis is to obtain a quality parameter used in a payment scheme. These analyses are normally carried out on a central laboratory, by the use of complex instruments.

The reliable operation of any instrument according to the invention further makes it suited for the use with an automated milking system, often called automatic milking systems, where the milking is carried out in an apparatus which is placed where the animals, normally cows, goats, sheeps or buffaloes have free access. The milking is activated upon the entering of the animal in the apparatus and the milking apparatus is operated, substantially without permanent operator supervision.

Accordingly, there is provided in another aspect of the present invention a system for regulating a milking process, said system comprising i) detecting means for identifying at least one volume of milk, ii) means for assessing particles in the identified volume by either
  a) counting of substantially individual somatic cells in the volume of milk, or
  b) assessing at least one property of at least one biological particle in the volume of milk iii) storage means for storing and providing at least one result of the assessment of particles in the identified volume of milk, iv) storage means for storing and providing at least one predetermined milk quality parameter, v) processing means for correlating the at least one result provided in iii) to the at least one predetermined milk quality parameter provided in iv), and vi) means for regulating the milking process based on the correlation obtained in step v).

In one embodiment the system further comprises means for assessing at least one chemical or physical property of the milk, said assessment being preferably made substantially simultaneously with the assessment of the particles in the identified volume of milk.

According to the invention, an array of detection elements can be utilised in combination with appropriate electronic components, to accomplish the assessment of somatic cells in a milk or a milk product analyte material by placing a portion of the analyte material in a sample compartment, the sample compartment in many embodiments of this invention being two windows of glass, or other transparent material, separated by a spacer with inlet and outlet which allows the sample to be replaced between measurements; in one embodiment the sample compartment is a tube, substantially circular, or substantially elliptical in profile. The presence of a somatic cells will normally cause the signal from detection element to deviate from a normal level, e.g. a base-line level, either towards higher signal intensity or toward lower signal intensity, but for the sake of clarity in the following it will be assumed that such deviation is toward higher signal intensity.

The present invention is based on the arrangement of the sample in such a manner that it extends over a "window" of a substantial area and detection of signals from the samples in the form of an "image" on an array of detection elements, the array of detection elements comprising individual elements each of which is capable of sensing signals from a part of the sample window area, the array as a whole being capable of sensing signals from substantially all of the sample window area, or at least a well defined part of the sample window area.

As will appear from the following, the arrangement of the sample and the detection elements in this way will allow the determination of the number of the somatic cells per volume in a much more simple and economic manner, while retaining a high accuracy of the determination. Also, as will be explained in the following, the use of an array of detection elements "observing" an exposed area of the sample makes it possible to use quite simple means for generating signals from the sample and quite simple and sensitive detection means.

Thus, an aspect of the invention can be expressed as a method wherein the assessment is an assessment of the number of somatic cells in a volume of liquid milk or a milk product material, the method comprising arranging a sample of the liquid sample material in a sample compartment having a wall defining an exposing area, the wall allowing signals from the sample to pass through the wall and to be exposed to the exterior, forming an image of signals from the sample in the sample compartment on an array of detection elements, processing the image on said array of detection elements in such a manner that signals from said particles are identified as distinct from the sample background, and, based on the signals from said particles identified assessing the number of particles in a volume of said liquid sample material.

Expressed in a more general way, this aspect relates to an assessment of somatic cells in a milk or a milk product analyte material, comprising arranging a volume of a liquid sample representing the analyte material in a sample compartment having a wall part defining an exposing area, the wall part allowing electromagnetic signals from the sample in the compartment to pass through the wall and to be exposed to the exterior, exposing, onto an array of active detection elements, an at least one-dimensional spatial representation of electromagnetic signals having passed through the wall part from the sample in the sample compartment, the representation being one which is detectable as an intensity by individual active detection elements, under conditions which will permit processing of the intensities detected by the array of detection elements during the exposure in such a manner that representations of electromagnetic signals from the somatic cells are identified as distinct from representations of electromagnetic signals from background, the size of the volume of the liquid sample being sufficiently large to permit the assessment of the number of somatic cells to fulfil a predetermined requirement to the statistical quality of the assessment, preferably based on substantially one exposure, processing the intensities detected by the detection elements in such a manner that signals from the somatic cells are identified as distinct from background signals, and correlating the results of the processing to the number of somatic cells in the liquid analyte material.

The exposure of the electromagnetic signals having passed from the domain onto the array of detection elements will normally correspond to forming an "Image" of the domain (such as an exposing area of a wall part of a sample compartment) on a two-dimensional array of detection elements, but it is also possible to use a one-dimensional spatial representation, obtained by suitable optical means, in which case the array of detection elements need not be more than one-dimensional, such as a linear array of detection elements. In special embodiments, a linear array of detection elements can also be used for receiving a two-dimensional image of electromagnetic radiation, provided the area of each element is sufficient to receive.

The intensity detected by the array of detection elements may be a charge built up due to the electromagnetic radiation, or it may be, e.g., the intensity of a current passing through the individual element as a result of the electromagnetic radiation.

The conditions of the exposure with respect to the various parameters involved, such as will be explained in greater detail below, are adapted so that the intensities detected by the array of detection elements can be processed, using suitable processing means, typically image processing means and methods, in such a manner that the intensities which have been detected as representations of electromagnetic signals from the biological particles are identified as distinct from representations of background signals.

The size of the volume of the liquid sample on which measurement is made, or from which the particles are isolated, should be sufficiently large to permit the determination of the concentration of somatic cells to fulfil a predetermined requirement to the statistical quality of the assessment based on substantially one exposure. As will be explained in the following, it is a characteristic feature of the present invention that it permits the gathering of sufficient information in one exposure to allow a high statistical quality in spite of the fact that the assessment can be performed in an extremely simple manner. One reason for this is that the method of the invention is normally performed using much smaller enlargements of the image projected onto the array of detection elements than has hitherto been considered possible, and in some cases even reductions, in contrast to enlargements. For a number of applications, the degree of enlargement is just around 1:1, in contrast to most automated microscopy methods which use larger enlargements and several observations. In connection with the present invention, the term "substantially one exposure" is to be understood as one exposure or in some cases just a few exposures such as two, three or four exposures, but the by far preferred embodiment it so use just one exposure, such as is made possible by the invention. The exposure may, under certain circumstances, be performed as a number of sub-exposures before the intensity detected by the array elements is processed, but this is normally not necessary or preferred.

The formation of an image of the sample on the array of detection elements may be performed by arranging the array of detection elements in close contact or substantially in close contact with the exterior of the exposing wall of the sample compartment, or by using an image-forming means, such as a lens comprising one or several elements, arranged in the light path between the exposing wall of the sample compartment and the array of detection elements.

Another aspect of the invention relates to a method for the regulation of the handling of milk during milking, comprising acquiring and/or identifying one or more volume(s) of milk, for instance by flowing a volume of milk out of the main flow of milk, or by allowing a substantially defined part of the milk flow to be analysed, assessing particles in the volume(s) of milk, the assessment being one or more of the following:

counting of substantially individual somatic cells in the volume of milk, assessing one or more properties of one or more types of biological particles in the volume of milk such as morphological property (shape or size) or the number of particles, preferably substantially simultaneously assessing one or more chemical or physical property of the milk, transferring at least one result of the assessment of particles in the volume of milk, and preferably at least one result of the assessment of chemical and physical property of the milk to regulating means, capable of regulating the handling of at least a portion of the milk being milked according to a set of predetermined and/or calculated parameters, such as limit for the number of somatic cells or particles, and at least one result of the assessment of particles in the volume of milk, and preferably at least one result of the assessment of chemical and physical property of the milk.

When appropriate the result of the counting of individual somatic cells is correlated to a value substantially representing the number of somatic cells per volume of milk, by the use of one or more calculated and/or predetermined parameter(s). To assure the quality of the assessment of the number of somatic cells the number of individual somatic cells counted normally should be 2 or more, preferably 4 or more. A further improvement in the quality of the assessment of the number of somatic cells can be obtained by counting more than 10, even more than 20 and even as many as 50 somatic cells or more. If still higher quality is sought for the determination of the number of somatic cells 100 or more, sometimes 200 or more, or even 400 or more somatic cells should be counted.

Similarly the quality of the assessment of the number of somatic cells can be expressed as the relative precision error in the counting of the number of individual somatic cells, defined as the ratio of the error in the assessment (expressed as one standard deviation of repeated measurement) to the obtained number of somatic cells. In one preferred embodiment such relative precision error is at the most 30%, and in others at the most 20%. In embodiments where high precision is preferred a relative precision error is at the most 15%, or at the most 10%, preferably at the most 5%, and even at the most 2%.

Further the quality of the assessment of the number of somatic cells can be expressed as relative error of accuracy, defined as the ratio of the error in the assessment (expressed as one standard deviation of accuracy) to the obtained number of somatic cells. Often it is preferred that error of accuracy is at the most 30%, while other embodiments preferably have error of accuracy at the most 20%, or at the most 15%. In embodiments were high accuracy is preferred, an error of accuracy of at the most 10% is preferred, even at the most 5%, or as low as at the most 2%.

When assessing biological particles in the milk the particles often have diameter of more than 0.1 mm, or even more than 0.5 mm, or more than 1 mm. Still larger particles, such as those having diameter of more than 2 mm, and even those with diameter of more than 5 mm can be used in preferred embodiment of the present invention. These biological particles are often particles containing protein, particles containing somatic cells or particles containing body tissue.

One quality parameter of milk is the presence of blood in the milk, and one preferred embodiment of the present invention is based on the assessment of the number of blood particles.

Besides the assessment of particles, the assessment of one or more chemical properties such as the measurement of the concentration of one or more of fat, protein, lactose, citric acid, urea, haemoglobin, ketones, carbon dioxide, oxygen, pH, potassium, calcium, sodium is preferred in order to improve the quality of determination of the handling of milk. Similarly the assessment of one or more physical properties is the measurement of one or more of: temperature, conductivity, light scatter is often preferred.

Due to the fact that the milk from individual quarters or teats can have different properties, it is often preferred to be able to perform: the assessment of the number of individual somatic cells and/or the correlation of the counting to a value substantially representing the number of somatic cells per volume of milk, the assessment of one or more biological particles, the assessment of one or more chemical properties, the assessment of one or more physical properties, separately for one or more individual quarter(s). Similarly it is often of interest to regulate the handling of the milk from individual quarters individually when regulating the handling of milk during milking.

In many preferred embodiments the assessment of particles in the milk, and/or the assessment of one or more chemical or physical property of the milk is done substantially before and/or after the identification of the individual animal being milked. Often such identification could be done by identification means reading one or more data carried by the individual animal. Having identified the individual animal it could be advantageous to decide whether the animal were to be milked, this decision could be determined by determination means, the determination means taking into account the identification of the animal and one or more information concerning the time(s) of previous milking and/or one or more information concerning the health of the animal.

The regulation of the handling of milk according to the present invention preferably results in directing the flow of milk from at least one inlet to one or more storage means and/or outlets. The flow of milk preferably enters the automated milking system through at least one teat cup that is applied to the teats of the udder of the animal to be milked. The at least one teat cup is preferably operated by means of a sensor means sensing the position of the udder of the animal. The at least one teat cup preferably comprises four separate inlets. This makes it possible to assess somatic cells in a milk sample originating from individual teats. Consequently, the individual assessment performed for each teat makes it possible to regulate said milking process based on an assessment of somatic cells in milk originating from each individual teat.

The regulation may be performed by a regulation means such as an automatic valve operably linked e.g. to one or more of a storage means for storing and providing at least one result of the assessment of particles and a storage means for storing and providing at least one predetermined milk quality parameter. Alternatively, the regulation means such as an automatic valve may be operable linked to a processing means for correlating said at least one result of the assessment to said at least one predetermined milk quality parameter. Irrespective of the linkage of the regulation means to said at least one storage means or a processing means, the regulation of the milking process is based on performing a real-time assessment of e.g. the number of somatic cells in a flow of milk through an automated milking system, and regulating the automated milking process preferably at least substantially simultaneous with said real-time assessment of e.g. somatic cells.

The real-time assessment and regulation results in an quick, accurate and reliable handling of the milk flow through the automated milking system. The opening and closing of at least one valve directs the flow of milk and ensures that a maximum volume of milk of a predetermined quality passes through the milking system to a storage means for milk for consumption, whereas only a minimum amount of e.g. mastitis infected milk is physically separated from the milk of good quality that is intended for consumption or further processing.

The assessment of somatic cells in the milk being milked may be performed by analysing a main milk flow passing through said automated milking system. However, the assessment of somatic cells may also be performed by analysing an auxiliary milk flow passing through a particular section of said automated milking system equipped with detection means capable of performing e.g. automated microscopy. The assessment of somatic cells may also take place in a chamber being operably linked to one or both of said main and auxiliary milk stream. The linkage of said chamber with said milk flow may be an automatic valve that permits the milk flow to enter the chamber at predetermined time points. The milk in the chamber may be discarded following the assessment or it may be redirected back into the main or auxiliary milk flow.

The volume of the sample to be analysed is a product of the assessment volume and the flow of milk through said assessment volume. The assessment volume may be defined e.g. by the dimensions of the main milk flow or the auxiliary milk flow. The dimensions may also be a predetermined value or a set of predetermined values characteristic for the detection means chosen for the assessment of the number of e.g. somatic cells in the milk flow being analysed.

The detection means are preferably capable of forming an image of at least one signal originating from at least one somatic cell or at least one property of at least one biological particle comprised in the milk flow. The image formed from at least one signal may be further processed in order to differentiate a signal representing the presence of at least one somatic cell in said milk flow being assessed from any signal attributable to background "noise". Having performed this further processing it is possible to assess the number of e.g. somatic cells in the milk flow being analysed by means of identifying somatic cells in substantially individual numbers based on the processed image.

The assessment of somatic cells based on the presentation of a processed image identifying somatic cells in a milk flow sample in substantially individual numbers will depend on the detection means employed for obtaining and processing the signal originating from the milk sample. It may be desirable to add an enhancer capable of enhancing said signal. An enhancer is preferably added to a milk sample in the separate chamber, and the sample including the enhancer is discarded after signal detection and/or processing.

In one preferred embodiment of the invention, the signal, or a part thereof, is processed to generate a profile of a milk sample for wave lengths in the mid-IR range, i.e. from about 1100 nm to about 2500 nm. The mid-IR range generate results of a more component-specific nature than near-IR range.

An optimal regulation of the handling of milk in relation to a set of predetermined milk quality parameters preferably allow according to one preferred embodiment a correct regulation of handling of milk in at least 85%, or even in at least 90% of the performed milkings. Still other embodiments allow correct regulation of the milk in at least 95% of the milkings, and even in at least 98% of the milkings.

For the purpose of heard management it is of interest to store at least one of the results of the assessment of the volume of milk by transferring the at least one of the results to a storage means, preferably where the result is/are identified by identification of the animal and the data of the storage means is available to computing means.

As mentioned previously it is of importance to be able to control the handling of milk during milking when the milking apparatus is a automatic milking system.

The assessment of particles, such as the counting of somatic cells, or the determination of size and/or shape of biological particles, can, according to the present invention, be performed by means of automated microscopy methods. In particular, when the assessment of particles is performed by automated microscopy, this could be performed by creating a spatial image representation of electromagnetic irradiation from an exposing domain containing a sample of the milk and performing a quantitated detection of the image. In order to assure preferred quality of the assessment of particles, the volume of the liquid sample from which electromagnetic radiation irradiated is detected is preferably in the range between 0.01 µl and 20 µl or more preferably in the range between 0.04 µl and 4 µl.

For the assessment of particles it is often preferred that the signal which is detected is a signal which is substantially caused by attenuation of electromagnetic signal, and/or by emission of electromagnetic irradiation by photoluminescence, the attenuation and/or the photoluminescence being associated to one or more molecules which is/are a part of the particles. Still it is often preferred that the signal which is detected for the assessment of particles substantially originates from one or several types of molecules which bind to, are retained within, or interact with, the particles, such molecules being added to the sample before or during exposure of electromagnetic signals, the molecules being molecules giving rise to one or several of the following phenomena: attenuation of electromagnetic radiation, photoluminescence when illuminated with electromagnetic radiation, scatter of electromagnetic radiation, raman scatter. The particles are preferably somatic cells and the molecules are preferably DNA and/or proteins.

For this purpose it is often an advantage to add an effective amount of one or more nucleic acid dyes and/or one or more potentiometric membrane dyes. Furthermore, many such chemicals are considered hazardous or where environmental exposure should be minimised, it is preferred to add chemicals in reduced quantity and therefore when a nucleic acid dye or nucleic acid dyes is/are added an amount of 0.3–30 µg per ml of the sample is preferably used. When considering nucleic acid dyes those are preferably selected from the group consisting of: phenanthridines (e.g. ethidium bromide CAS#: 1239–45-8, propidium iodide CAS#: 25535–16-4), acridine dyes (e.g. acridine orange CAS#: 65–61-2/CAS#: 10127–02-3), cyanine dyes (e.g. TOTO™-1 iodide CAS#: 143 413-84-7-Molecular Probes, YO-PRO™-1 iodide CAS#: 152 068-09-2-Molecular Probes), indoles and imidazoles (e.g. Hoechst 33258 CAS#: 023 491-45-4, Hoechst 33342 CAS#: 023 491-52-3, DAPI CAS#: 28718–90-3, DIPI (4',6-diimidazolin-2-yl)-2-phenyl-indole)). More preferably the nucleic acid dye added is propidium iodide CAS#: 25535–16-4. When the chemical component is a potentiometric membrane dye it can be one or several of the following, but not limited to: Rhodamine-123, Oxonol V.

Often it is possible to enhance the effect of any dye added, by the addition of one or more chemical or reagents, such as by adding t-Octylphenoxypolyethoxyethanol (Triton X-100). In order to assure secure fixation of any chemical, thus avoiding spilling, it is found that there is advantage when adding any chemical to the sample that such addition of chemicals is on a substantially solid, and/or substantially non-aqueous, and/or substantially freeze dried form. When any chemical is added on solid, non-aqueous or freeze dried form it can be of interest to enhance the rate of dissolution or solubilisation for instance by adding one or more types of organic or inorganic salts.

Concerning the assessment of any chemical constituent in a sample such assessment is preferably based on spectrophotometric measurement, the spectrophotometric measurement being, e.g., one or several of; mid-infrared attenuation, near-infrared attenuation, visible attenuation, ultra-violet attenuation, photoluminescence, raman scatter, nuclear magnetic resonance. Another preferred method of assessment of chemical constituent is based on potentiometric measurement, preferably by the use of an ion selective electrode.

In order to minimise the effect of the addition of any chemicals on the volume of the sample, for instance due to dilution, it is preferred that the reagents or chemical which are added are on a substantially solid, and/or substantially non-aqueous, and/or substantially freeze dried form.

When adding any chemicals the sample compartment is often an integrated part of a device further comprising a reagent container, said reagent container containing one or several reagent component(s).

Since it is of interest to be able to make the decision of the preferred method of handling of the milk, it is preferred that at least a part of the volume of milk being assessed is a collected substantially at the beginning of milking, preferably before 100 ml of milk have been milked, more preferably before 20 ml of milk have been milked, more preferably before 5 ml of milk have been milked. Another also preferred method, for instance when the substantially entire volume of milk being milked is contained in a temporary storage means until the milking is at least substantially completed, is that the milk being assessed is collected substantially during the entire milking, preferably where the composition of the milk is a substantial representation of the entire milk being milked. Similar results can be obtained through another preferred embodiment, where the volume of milk being assessed is collected at different times during milking, preferably where the result of one or more assessment can be correlated to the property of the entire milk being milked.

Since the determination of the method of handling of the milk, is preferably done substantially automatically, or at least with minimal manual supervision, it is a clear advantage to assure highest possible reliability of any assessment of the milk. One aspect which might influence the reliability of any assessment is possible contamination of any part of the system used for the assessment, in particular any domain which holds milk being determined. In one preferred embodiment of the present invention, the determination used for the assessment of particles, or chemical or physical property of milk is performed in a substantially disposable device, preferably where the device is discarded or disposed of after the assessment of a predetermined number of volumes of milk. By discarded or disposed of it is understood that the device is not used for any further assessment, at least not until cleaning, regeneration or at least manual or automatic inspection has taken place. One preferred method is to discard or dispose of such disposable device is when it becomes at least partially blocked. When considering if a device is blocked it is understood that this might be when obstruction of flow or obstruction of the exposure of electromagnetic irradiation is detected. Another preferred method is to discard or dispose of such disposable device in the event ft has become substantially empty of any chemical or reagent used for the assessment. Such disposable device can be considered substantially empty, for instance when the amount of any chemicals or reagents present is substantially not adequate to perform reliable assessment.

Due to many aspects of the determination of any signal used for the assessment of the milk, it can become difficult to flow the sample into or through at least a part of the detection system (e.g. any domain from which signals are irradiated), for instance if diameter or thickness preferred for the determination is so small that it can have impact on the flow of the sample. In such case it is often preferred that at least one physical dimension of the domain substantially partly determines the volume of the domain, and where the at least one physical dimension is substantially different during at least a part of any period when a sample is introduced to the domain and at least a part of any period when a measurement or detection is performed, preferably where the effect is such that the volume of the domain is substantially larger during at least a part of any period when a sample is introduced to the domain than in at least a part of any period when a measurement or detection is performed. Thus it could be possible to flow the sample into the domain prior to detection while the dimension is large and then reduce the dimension prior to determination. In particular it is preferred that the volume during at least a part of any period when a sample is introduced to the domain is at least 10% larger than the volume during at least a part of any period when a measurement or detection is performed, preferably where the volume is 25% larger, more preferably where the volume is 50% larger, more preferably where the volume is 100% larger, more preferably where the volume is 200% larger, more preferably where the volume is 400% larger.

In many preferred embodiments of the present invention at least one of the assessments of particles, or chemical or physical property of milk is activated or controlled by the controlling means controlling the milking. Furthermore it is often preferred that such assessment is performed without substantially any human intervention.

A number of embodiment and variants of the invention appear from the figures and examples which follow.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiments of the herein disclosed invention are meant to be included as come within the scope of the claims.

EXAMPLE 1

Figure 1:
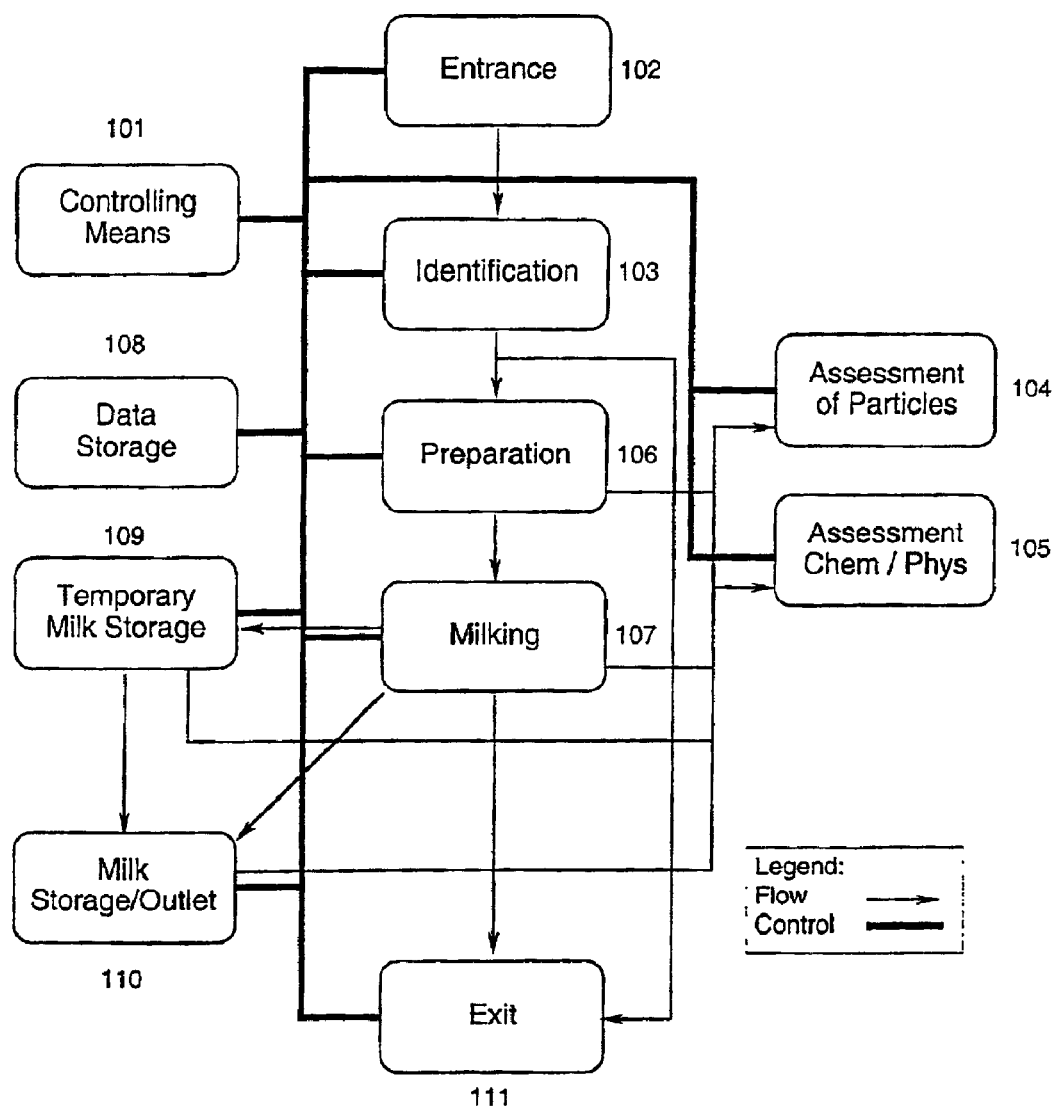
FIG. 1 illustrates a method and a system used for the determination of the handling of milk during milking.

A Method and a System for Controlling Milk Handling During Milking

FIG. 1 illustrates a method and a system for the handling of milk during milking including embodiments of the present invention. The method and the system are with the appropriate modifications applicable for milking where the milking is supervised manually and also for milking where the milking is automatically supervised and controlled. FIG. 1 shows the flow of milk and/or the animal being milked as well as the flow of information and/or control.

The animal being milked enters the milking system through the entrance 102, which can either be a physical entrance, e.g. to a automatic milking system, or an imaginary entrance/initiation of/to the milking system. The entrance can be controlled by controlling means 101. Then the animal is identified by identification means 103 and the results of the identification are made available to the controlling means. Based on the identification, and preferably also other information, such as time and date of previous milking of the animal being identified, the animal is either allow to leave the system through the exit 111 if milking is not required, or the milking process is initiated.

Normally the first steps in the milking process is the preparation of the animal. This can include washing and/or cleaning of the teats, usually followed by drying of the teats. During the preparation small volumes of the milk can be collected and particles in this sample are assessed 104 in order to gather information about the quality of the milk, with the objective to aid in the controlling of the milking and/or the controlling of the handling of the milk. Such assessment can be counting of somatic cells, counting and/or identification of blood particles, counting and/or identification of large biological particles in the milk, preferably assessment of at least two properties or parameters being performed. In addition one or several chemical or physical properties of the milk can be assessed 105. The result of the assessment of particles and optionally the results from the assessment of chemical or physical property are made available to the controlling means making it possible to determine the controlling of the milking or the handling of the milk. The assessment and the controlling can be done separately for each quarter being milked or by treating all quarters in the same manner.

When the preparation is completed the milking 107 can be initiated. At any time during the milking a sample can be taken or identified and assessed. The result of the assessment can be made available to the controlling means allowing adjustment in the controlling of the milking or the handling of the milk. This can be done separately for each quarter being milked or by treating all quarters in the same manner. Preferably samples substantially representing the entire milk being milked are collected and analysed individually and/or analysed combined thus giving results which at least substantially reflect the property of the combined entire milk being milked. This can be done separately for milk from each quarter being milked or for combined milk from all quarters.

The milk from the milking can either be directed to one or several temporary milk storage means 109 or to one or several milk storage means and/or outlets 110 the flow of milk being controlled by the controlling means. Samples from the temporary milk storage means and/or milk storage means and/or outlets can be collected and submitted to assessment of particles and/or chemical or physical properties. The results of the assessments are made available to the controlling means and the controlling of the milking and/or the controlling of the handling of the milk can be based on these results. For instance any milk in the temporary storage means can be transferred to one or several storage means and/or outlets based on the results from assessments of samples taken from the temporary storage means and/or the storage means and/or outlets, e.g. when the objective is to adjust any property of the milk in a storage mean in reference to a predetermined level of the property, e.g. the property being the number of somatic cells per volume of the milk.

Any result obtained during the preparation and/or the milking can be made available to data storage means 108. The data can then be made available to the controlling means or it can be used for herd management purposes.

When the milking is ended the animal leaves the milking system through the exit.

Example 2

Principle for the Assessment of the Number of Particles in a Volume of Milk According to the Present Invention One method of assessing particles in milk according to the invention is described in the following.

The milk solution is placed in the sample compartment by use of a peristaltic pump that is situated down-stream from the sample compartment. A valve is placed in the flow system immediately adjacent to the sample compartment in order to reduce the movement of the sample in the sample compartment.

The assessment of the number of particles in a volume of milk is performed on an instrument according to the present invention, equipped with an excitation module comprising a halogen light source, OSRAM-64255 (8V, 20W Photo Optic Lamp), an optical filter, Ferroperm SWP550 (double sided interference filter on a 2 mm substrate (Hoye, BG-39) which absorbs infra-red radiation) and a heat absorbing filter, (Schott KG5, 3 mm in thickness), and a detection module comprising a focusing lens, standard x4 microscope objective with numerical aperture of 0.10, arranged in such a way as to give a magnification of approximately ×1 on the sensor elements, an optical filter, (Schott OG590, thickness 3 mm), and a heat absorbing filter, Schott KG5 (3 mm in thickness), and a CCD detector, SONY-CX 045 BL.

A portion of the milk solution is placed between two substantially parallel plates of glass, placed approximately in the focus plane of the detection module, and irradiated by excitation light emitted from the excitation module. The distance between the two parallel glass plates is approximately 100 μm. The volume being detected by the detection module, defined by the size of the CCD, the magnification used, and the distance between the parallel glass plates is equivalent to approximately 1 μl, thus containing approximately 0.5 μl of milk.

Each observation may be based on the measurement of at least one portion of the milk solution.

What is claimed is:

1. A method for regulating a milking process, said method comprising the steps of
    i) identifying at least one volume of milk,
    ii) assessing particles in the identified volume by either
        a) counting of substantially individual somatic cells in the volume of milk, or
        b) assessing at least one property of at least one biological particle in the volume of milk,
    iii) obtaining at least one result of the assessment of particles in the identified volume of milk,
    iv) providing at least one predetermined milk quality parameter,
    v) correlating the at least one result obtained in step iii) with the predetermined milk quality parameter provided in step iv),
    vi) transferring any one or both of
        c) the at least one result obtained in iii), and
        d) the correlation obtained in v)
        to regulating means capable of regulating the milking process of at least a portion of the milk being milked, and
    vii) regulating the milking process based on any one or both of c) the at least one result obtained in iii), and d) the correlation obtained in v).

2. A method according to claim 1, said method further comprising assessing one or more chemical or physical property of the milk.

3. A method according to claim 2, wherein the assessment of one or more chemical properties comprises the estimation of the concentration and/or the level of one or more of: fat, protein, lactose, citric acid, urea, haemoglobin, ketones, carbon dioxide, oxygen, pH, potassium, calcium or sodium.

4. A method according to claim 2, wherein the assessment of one or more physical properties comprises the measurement of one or more of: temperature, conductivity, or light scatter.

5. A method according to claim 2, wherein the assessment of one or more chemical properties and/or the assessment of one or more physical property is done for one or more individual quarter(s).

6. A method according to claim 2, wherein the assessment of any chemical property is based on spectrophotometric measurement and/or potentiometric measurement.

7. A method according to claim 2, wherein the assessment of particles in the milk, and/or the assessment of one or more chemical or physical property of the milk, is done before or after the identification of the individual animal being milked.

8. A method according to claim 2, wherein at least one of the assessment of particles, chemical or physical property of milk is performed in a disposable device.

9. A method according to claim 2, wherein at least one of the assessment of particles, chemical or physical property of milk is performed in a domain where at least one physical dimension of the domain partly determines the volume of the domain, and where the at least one physical dimension is different during at least a part of any period when a sample is introduced to the domain and at least a part of any period when a measurement or detection is performed.

10. A method according to claim 2, wherein at least one of the assessment of particles, chemical or physical property of milk is activated or controlled by the controlling means controlling the milking.

11. A method according to claim 1, wherein the assessment of particles is the counting of biological particles present in the milk, the biological particles having diameter of more than 0.1 mm.

12. A method according to claim 1, wherein the biological particles are selected from the group consisting of: particles containing protein, particles containing somatic cells, and particles containing body tissue.

13. A method according to claim 1, wherein the assessment of particles is the counting of blood particles.

14. A method according to claim 1, wherein the counting of the number of individual somatic cells and/or the assessment of one or more particles is done for one or more individual quarter(s).

15. A method according to claim 1, wherein the regulation of the handling of the milk is done individually for milk from one or more quarter(s).

16. A method according to claim 1, wherein the assessment of particles in the milk is done before or after identification of the individual animal being milked.

17. A method according to claim 1, wherein the regulation of the handling of the milk is directing the milk to one or more storage means and/or outlets.

18. A method according to claim 1, wherein at least one of the result of the assessment of the volume of milk is/are transferred to a storage means, the data of the storage means being available to computing means.

19. A method according to claim 1, wherein the assessment of particles is performed by automated microscopy performed by creating a spatial image representation of electromagnetic irradiation from an exposing domain containing a sample of the milk and performing a quantitated detection of the image.

20. A method according to claim 19, wherein the volume of the liquid sample from which electromagnetic radiation is irradiated is detected is in the range between 0.01 μl and 20 μl.

21. A method according to claim 19, wherein the signal which is detected for the assessment of particle is a signal which is caused by attenuation of electromagnetic signal, the attenuation being associated to one or more molecules which is/are a part of the particle.

22. A method according to claim 21, wherein the signal which is detected for the assessment of particles originates from one or several types of molecules comprising one of the following: a) molecules which bind to the particles; b) are retained within the particles; or c) interact with the particles, such molecules being added to the sample before or during exposure of electromagnetic signals, the molecules being molecules giving rise to one or several of the following phenomena selected from the group consisting of: attenuation of electromagnetic radiation, photoluminescence when illuminated with electromagnetic radiation, scatter of electromagnetic radiation, or raman scatter.

23. A method according to claim 22, wherein an effective amount of one or more nucleic acid dyes and/or one or more potentiometric membrane dyes is added.

24. A method according to claim 23, wherein there is/are added one or more nucleic acid dyes selected from the group consisting of: acridine dyes cyanine dyes indoles and imidazoles.

25. A method according to claim 22, wherein any chemical added has the effect of aiding in the binding of one or more dyes to a particle.

26. A method according to claim 22, wherein any chemical added has the effect of increasing the rate of dissolution or solubilisation of any chemical on solid non-aqueous or freeze dried form.

27. A method according to claim 22, wherein the signal which is detected for the assessment of particle is a signal which is caused by emission of electromagnetic irradiation by photoluminescence, the photoluminescence being associated to one or more molecules which is/are a part of the particle.

28. A method according to claim 19, wherein the signal which is detected for the assessment of particle is a signal which is caused by emission of electromagnetic irradiation by photoluminescence, the photoluminescence being associated to one or more molecules which is/are a part of the particle.

29. A method according to claim 19, wherein the volume of the liquid sample from which electromagnetic radiation is irradiated is detected is in the range between 0.04 µl and 4 µl.

30. A method according to claim 1, wherein the volume of milk being assessed is a sample of milk which is undiluted, except for the addition of the reagents used in the assessment.

31. A method according to claim 1, wherein at least a part of the volume of milk being assessed is acquired and/or identified at the beginning of milking.

32. A method according to claim 1, wherein the assessment of particles is performed in a disposable device.

33. A method according to claim 32, wherein at least a part of the volume of milk being assessed is acquired and/or identified before 100 ml of milk have been milked.

34. A method according to claim 1, wherein of the assessment of particles is performed in a domain where at least one physical dimension of the domain partly determines the volume of the domain, and where the at least one physical dimension is different during at least a part of any period when a sample is introduced to the domain and at least a part of any period when a measurement or detection is performed.

35. A method according to claim 1, wherein the assessment of particles is activated or controlled by the controlling means controlling the milking.

36. A method according to claim 1, said method further comprising assessing one or more chemical or physical property of the milk simultaneously with the assessment of the particles in the identified volume of milk.

37. A method according to claim 1, wherein the assessment of particles is the counting of biological particles present in the milk, the biological particles having diameter of more than 0.5 mm.

38. A system for regulating a milking process, said system comprising:
  i) detecting means for identifying at least one volume of milk;
  ii) means for assessing particles in the identified volume by either
    a) counting of substantially individual somatic cells in the volume of milk; or
    b) assessing at least one property of at least one biological particle in the volume of milk;
  iii) storage means for storing and providing at least one result of the assessment of particles in the identified volume of milk;
  iv) storage means for storing and providing at least one predetermined milk quality parameter;
  v) processing means for correlating the at least one result provided in iii) to the at least one predetermined milk quality parameter provided in iv); and
  vi) means for regulating the milking process based on the correlation obtained in step v).

39. A system according to claim 38, said system further comprising means for assessing at least one chemical or physical property of the milk.

40. A system according to claim 39, wherein the assessment of one or more chemical properties comprises the estimation of the concentration and/or the level of one or more of: fat, protein, lactose, citric acid, urea, haemoglobin, ketones, carbon dioxide, oxygen, pH, potassium, calcium, or sodium.

41. A system according to claim 40, wherein at least one of the assessment of particles, or chemical or physical property of milk is performed in a domain where at least one physical dimension of the domain partly determines the volume of the domain, and where the at least one physical dimension is different during at least a part of any period when a sample is introduced to the domain and at least a part of any period when a measurement or detection is performed.

42. A system according to claim 40, wherein at least one of the assessment of particles, or chemical or physical property of milk is activated or controlled by the controlling means controlling the milking.

43. A system according to claim 39, wherein the assessment of one or more physical properties comprises the measurement of one or more of: temperature, conductivity, or light scatter.

44. A system according to claim 39, wherein the assessment of any chemical property is based on spectrophotometric measurement and/or wherein the assessment of any chemical property is based on potentiometric measurement.

45. A system according to claim 39, further comprising detection means for identifying the animal and one or more information concerning the health of the animal.

46. A system according to claim 38, wherein the assessment of individual somatic cells and/or the correlation of the counting to a value representing the number of somatic cells per volume of milk is done for one or more individual quarter(s).

47. A system according to claim 38, wherein the regulation of the handling of the milk is done individually for milk from one or more quarter(s).

48. A system according to claim 38, further comprising detection means for identifying the animal and one or more information concerning the time of previous milking.

49. A system according to claim 38, wherein the regulation of the handling of the milk is directing the milk to one or more storage means and/or outlets.

50. A system according to claim 49, further comprising detection means for identifying the animal and one or more information concerning the health of the animal.

51. A system according to claim 38, wherein at least one of the result of the assessment of the volume of milk is/are transferred to a storage means, wherein the result of identification of the animal is stored, the data of the storage means being available to computing means.

52. A system according to claim 38, wherein the milking apparatus is an automatic milking system.

53. A system according to claim 38, wherein the assessment of particles is performed by automated microscopy performed by creating a spatial image representation of electromagnetic irradiation from an exposing domain containing a sample of the milk and performing a quantitated detection of the image.

54. A system according to claim 53, wherein the volume identified is in the range between 0.04 µl and 4 µl.

55. A system according to claim 53, wherein the volume identified is in the range between 0.01 µl and 20 µl.

56. A system according to claim 38, wherein the volume of milk being assessed is a collected at different times during milking.

57. A system according to claim 38, comprising a disposable device comprising a sample compartment.

58. A system according to claim 38, wherein the assessment of particles is performed in a domain where at least one physical dimension of the domain partly determines the volume of the domain, and where the at least one physical dimension is substantially different during at least a part of any period when a sample is introduced to the domain and at least a part of any period when a measurement or detection is performed.

59. A system according to claim 38, wherein the assessment of particles is activated or controlled by the controlling means controlling the milking.

* * * * *